Oct. 19, 1937.  B. WEISS  2,096,153
IDENTIFYING METHOD AND MEANS FOR GARMENTS AND THE LIKE
Original Filed June 17, 1933
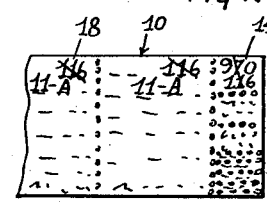
BENJAMIN WEISS,
INVENTOR,
BY Julian J. Wittal,
his ATTORNEY.

Patented Oct. 19, 1937

2,096,153

UNITED STATES PATENT OFFICE 2,096,153

IDENTIFYING METHOD AND MEANS FOR GARMENTS AND THE LIKE

Benjamin Weiss, Flushing, N. Y., assignor of one-half to Bert J. Matzner, Flushing, N. Y.

Application June 17, 1933, Serial No. 676,237
Renewed August 12, 1936

1 Claim. (Cl. 40—2)

This invention relates to methods and means for marking for identification garments and other similar goods left with tailors, cleaners and like establishments.

The main object of this invention is to provide a method and means as characterized hereinbefore which will be simple, inexpensive and the application and use of which will be expedient and will require less time and less labor than the identification systems now in use in similar establishments require.

Another object of this invention is to provide a method and means, as described hereinabove which will be applicable to a large number of garments with great saving of time, material and labor.

Other objects of this invention will be apparent as the specification of the same proceeds.

With such and other objects in view, my invention mainly consists in providing a smaller or larger number of tags, or labels, as required, each carrying two numbers thereon, the first one being a permanent number identifying the respective cleaning or tailoring establishments collecting the goods, while the second number, in every case will identify the particular customer whose goods were marked by said tags or labels; said tags having numbers or other inscriptions thereon, being made of lasting, water, gasoline and other cleaning material, resisting mediums, said tags or labels being easily attachable to garments, means also being provided to identify the customer represented by the second number on records given to said customer and on other records remaining with the cleaner or tailor.

In the drawing forming a part of this specification and accompanying the same;

Fig. 1 is a plan view of a preferred form of records and identifying means made according to my invention;

Fig. 2 is a fragmentary plan of a portion of permanent identifying means made as a portion of a somewhat modified form of my invention, while Figs. 3 and 4 indicate a third modification of my invention, designed to be used in cases where one customer leaves a large number of garments at the same time with the tailor or cleaner, and Fig. 5 is a sectional view on the line 2—2 of Fig. 1, reduced in scale and exaggerated in proportion.

Referring now to the drawing in detail by characters of reference, the numeral 10 indicates a preferred form of my recording and identifying system being in the form of a sheet of paper 10a (Fig. 5) subdivided into four sections, respectively, indicated by the numerals 11, 12, 13 and 14. Said sheet of paper may preferably form a page in a permanent record book of the tailor or cleaner and the innermost portion 11 thereof may be permanently secured into said book while perforations 15, 16 and 17 may be provided transverse to said page to separate the three sections 12, 13 and 14 each from the section 11 in front thereof and make said sections easily separable.

The sections 11, 12 and 13 may be made substantially identical and each will have, preferably in its right hand upper corner a large conspicuous figure 18, to identify the customer, printed thereon, in this case being the numeral 116. The body of each section 11, 12 and 13 will carry necessary printed matter and blanks generally indicated by the numeral 19 and into which the tailor or cleaner may insert the data relating to the case 116, including, for instance, the name of the customer, his address, number of the garments, character of the garments, date of receipt, date of promised delivery, etc. The last section 14 of the record or page 10, preferably being placed at the outermost free end thereof, will consist in the preferred form of my invention, of a number of individual subdivided labels or tags 20 being separated from one another by perforations 21, and being covered by a cleaning medium resisting lasting material, like cloth secured thereon, each tag or label 20 carrying the same identifying number 18; in this case the numeral 116 as the record slips 11, 12 and 13 are marked with. Each tag or label 20, however, will carry a second number 22, in this case being the numeral 970 which serves to identify the cleaner, tailor, or other shop or place which collected the garment, in question, and which turned it over, as is usual, to a central large cleaning establishment.

The bottom portion 23 of the section 14 may contain a number of preferably narrower tags or slips 24 of similar material and workmanship to the larger tags 20 and being separated therefrom and from each other by perforations 26, said smaller tags 24 showing in consecutive order the days of the week, like Monday to Saturday, one day being printed on each tag.

The use and operation of my novel identifying system and its means will be, as follows:

When a customer brings a number of garments like the coat, vest and pants of a man's suit, the three sections 11, 12 and 13 of the record book of the collecting agency will be filled in with the data enumerated hereinabove, like name and address of customer, dates of the receipt and promised delivery, pieces and characters of the garments, possible remarks, etc., after which, sections 12, 13 and 14 will be separated from each other and from the remaining permanent section 11 in the book. The remaining section 11 will give all the information to the collecting agency like the tailor, cleaner, etc., one section 12 will be given to the customer for his receipt and identifications and the third section 13 will be used for other record, possibly given to the collector of the central cleaning establishment, or said section 13 may be entirely eliminated from this system. The last section 14 will be subdivided into its individual tags or labels 20 and one of each will be permanently secured to one piece of garment brought by the respective customer by any appropriate method, as by staples, metal prongs or hooks using an appropriate staple or fastening machine, or simply securing tags 20 to the respective pieces of the garment by hand operation. Finally, one of the smaller tags 24 will be secured to a predetermined piece of garment in the collection like the vest in every suit, showing to the central cleaning establishment the date on which the goods must be returned.

It is obvious that by this method very simplified and absolutely reliable means are provided to quickly and easily mark the individual pieces of garments collected by a certain tailor, cleaner or other agency for a large central cleaning establishment, as it is well known and usual in this art. Sections 11, 12 and possibly 13 may be quickly and easily filled out with the necessary information and section 14 by its individual labels will permanently and indestructibly identify on the piece of garment the collecting agency from which they came and the individual customer of said collection agency, said data being automatically made identical with the data remaining with the collecting agency and with the individual customer. For quicker identification, the two numerals 116 and 970, respectively, on the tags secured on the garments may be made of different colors, for instance, 970 which is permanent on every garment coming from the same collection agency may be printed in red color to at once show and indicate to the central cleaning house, the individual tailor or cleaner to whom the garments have to be sent back, while the numeral 116 may be printed in black color. The cloth strip or section 14 may be secured on the respective page of the record book by simply extending the paper material 10a thereof, pasting the slip 14 thereon, and then providing the perforations 17, 21 and 26 through the same and the paper material thereunder. In Fig. 5, 10a indicates the paper material, 14 the cloth cover thereon, and 10b the layer of paste between the two.

It is obvious that the respective record sheet or page 10 in the tailor's book may be arranged in different forms from that shown in Fig. 1, like the section 14 may be placed between the sections 13 and 12, or even 12 and 11, if so desired, and also the sections 11, 12, and possibly 13 may be provided as separate leaves or pages of the record book, one underneath the other so that by placing appropriate copying material, like carbon paper between them, one single writing will take all the three records.

It is also obvious that other methods may be used to secure the cloth tag strip 14 on the material of the respective record page, like the individual tags 20 may carry the staples with which they are intended to be secured on the respective piece of garment and some of these staples or prongs may be used to secure the strip 14 on its page in the record book.

In Fig. 2 I show a modification of the permanent cloth strips or labels 14 which in this embodiment of my invention will not be made as part of the record pages or sheets 10 but will be provided in a separate book in large sheets or pages 27, each page containing a large number of individual tags or labels 28 marked by the two numerals 970 and 116, as before. The individual tags 28 are separated from each other by horizontal and vertical perforated lines 29 and 30, respectively, one or more horizontal or vertical rows of such individual tags 28 may be provided with the same second number 116. This system makes it easy to mark a large number of garments brought by the same customer since as many of the labels marked 116, 117, 118, and so on, indicating each individual customer may be used, as necessary, while the record book will contain but one record for each said customer.

Another method for cases where large numbers of garments are brought by the same customer is indicated in Figs. 2 and 3. In this embodiment again the strip 14 may be omitted from page 10 of the original record book, and a separate book is provided, a page of which is indicated in Fig. 3 generally by the numeral 31. This page also will consist of a desired larger number of individual cloth tags 32 separated from each other by horizontal and vertical perforations 33 and 34, and each of such permanent cloth tags will carry the general number 970 of the respective collecting agency and also a second number, which in this case for one or more rows will be 11a, for the next row 11b, etc. Individual pieces of garments brought by a customer will receive tags from the same row, like 11a or 11b, etc. and his record sheet 10 will be changed and marked by the respective numeral 11a, 11b, etc. instead of the usual number 116, 117, etc. printed thereon. This way, again, one single record in the book of the collecting agency will identify the customer and any desired number of pieces of garments which he brought, within reasonable limits.

For conciseness in the claims, the subdivided sections 11, 12 and 13 of the record sheet, or any of them, may be termed "major index fields" while the section 14, may be termed "working field" or "working index field" or the sections 11, 12 and 13 may be termed "major"; the sections 20, "minor"; and the sections 24 "sub-minor" each of the respective groups of sections when separated, one from the other, becomes composite "sets", each of a number required in practice, and for the purpose described.

It will be understood that changes and variations may be made in the parts and combinations of my device and I hereby reserve all my rights to any and all such changes as are within the spirit of the invention and the scope of the appended claim.

What I claim as new, is:

A tag sheet for tailors, cleaners, dyers and the like, comprising a major index portion and a portion forming an extension thereof and a set of minor index tags being divided therefrom and from one another by tear lines, said minor tags being of fabric material adapted to resist water, soap, chemicals and the like, for the purpose set forth, said extending portion underlying said minor tags and said tags being secured on said underlying portions, thereof; a first identifying mark on said major portion and on each of said minor tags, and a second identifying mark on each of said minor tags only, each of said marks being made in a manner adapted to resist water, soap, chemicals, and the like.

BENJAMIN WEISS.